United States Patent [19]

Luce et al.

[11] Patent Number: 4,879,086
[45] Date of Patent: Nov. 7, 1989

[54] NEUTRON ECONOMIC REACTIVITY CONTROL SYSTEM FOR LIGHT WATER REACTORS

[75] Inventors: Robert G. Luce, Glenville; Daniel F. McCoy, Latham; Floyd C. Merriman, Rotterdam; Steve Gregurech, Scotia, all of N.Y.

[73] Assignee: The United States of America as represented by The United States Department of Energy, Washington, D.C.

[21] Appl. No.: 250,040

[22] Filed: Sep. 27, 1988

[51] Int. Cl.$^4$ .............................................. G21C 1/00
[52] U.S. Cl. .................................... 376/173; 376/212; 376/339
[58] Field of Search ................ 376/173, 339, 212, 209

[56] References Cited

U.S. PATENT DOCUMENTS

| | | |
|---|---|---|
| 2,952,600 | 9/1960 | Newson . |
| 3,154,471 | 10/1964 | Radkowsky . |
| 3,219,535 | 11/1965 | Robbins ................................ 376/173 |
| 3,252,867 | 5/1966 | Conley ................................. 376/173 |
| 3,335,060 | 8/1967 | Diener ................................. 376/173 |
| 3,351,532 | 11/1967 | Raab, Jr. et al. .................... 376/173 |
| 3,671,392 | 6/1972 | Beaudoin et al. ................... 376/173 |
| 3,998,692 | 12/1976 | Bohanan et al. . |
| 4,481,164 | 11/1984 | Bollinger ............................. 376/339 |
| 4,507,259 | 3/1985 | Cowell et al. ....................... 376/173 |
| 4,770,840 | 9/1988 | Leroy et al. ......................... 376/209 |

FOREIGN PATENT DOCUMENTS

| | | | |
|---|---|---|---|
| 2011151 | 7/1979 | United Kingdom | ................ 376/173 |
| 8501826 | 4/1985 | World Int. Prop. O. | .......... 376/173 |

Primary Examiner—Harvey E. Behrend
Attorney, Agent, or Firm—William W. Randolph; Judson R. Hightower; Richard E. Constant

[57] ABSTRACT

A neutron reactivity control system for a LWBR incorporating a stationary seed-blanket core arrangement. The core arrangement includes a plurality of contiguous hexagonal shaped regions. Each region has a central and a peripheral blanket area juxapositioned an annular seed area. The blanket areas contain thoria fuel rods while the annular seed area includes seed fuel rods and movable thoria shim control rods.

1 Claim, 3 Drawing Sheets

NEUTRON ECONOMIC REACTIVITY CONTROL SYSTEM FOR LIGHT WATER REACTORS

BACKGROUND OF THE INVENTION

This invention is directed to a reactivity control system for a light water breeder reactor (LWBR). In particular, the LWBR reactivity control comprises a stationary seed-blanket core arrangement comprising a radial arrangement of the fuel into a pattern of discrete seed regions that contain $ThO_2$-$UO_2$ fuel pellets and discrete blanket regions that contain pure thorium dioxide fuel pellets. The United States Government has rights in this invention pursuant to Contract No. DE-AC12-76-SN00052 between the U.S. Department of Energy and the General Electric Company.

The continuous, world-wide growth of nuclear power based on current light water reactors will deplete readily obtainable supplies of the fissile fuel isotope uranium-235. While authoritative studies may disagree on the expected timing of this event, there is a general agreement that, to pursue nuclear power as a major energy source, the nuclear fuel cycle must take advantage of the potential energy available in the abundant fertile fuel isotopes, uranium-238 and/or thorium-232. Reactor technology in coming decades must shift away from the current light water reactor with a once-through fuel cycle toward more fuel efficient concepts, including fuel recycle, high energy converter reactors and breeder reactors.

Light water moderated converter reactors or breeder reactors using the thorium-232/uranium-233 fuel cycle are looked upon as attractive options for future nuclear reactors. The attractiveness of the thorium fuel cycle in a light water reactor derives from three major considerations; (1) the core, reactor equipment, primary system and balance of the plant are all based on the well-established technology of light water reactors; (2) fuel utilization is better than for the uranium/plutonium fuel cycle in a similar light water reactor application with recycled fuel and the thorium fuel cycle can achieve a self-sustaining breeder reactor system; (3) existing pressurized water reactor plants could be refitted with thorium fuel cycle converter cores, although the highest level of fuel utilizations are probably not achievable at full plant power ratings.

The atomic Energy Commission and its successor governmental agencies, ERDA and the Department of Energy, has attempted to demonstrate the potential of the thorium fuel cycle in light water moderated reactors from the mid-1970's. Various concepts are being explored, including pre-breeder, converter and advance breeder reactors including a scale-up of the Shippingport reactor operated by the Duquesne Light Company. A very recent development in this technology has advanced the concept that a practical commercial scale breeder may be made which does not rely upon a separate source, such as a pre-breeder and converter reactor to provide its initial load of fissile uranium-233. The concept includes a breeder reactor plant which becomes its own pre-breeder by using fuel elements of different dimensions for the initial pre-breeder core cycles.

The present invention is directed to a reactivity control system for the breeder concept of this type of pre-breeder/breeder reactor system. The reactivity control system for the breeder concept proposed in this application must perform all the functions of the reactivity control system in a commercial pressurized water reactor (PWR) but, in addition, it must perform those functions while minimizing the loss of neutrons to neutron poisons or other parasitic materials. For example, a typical present generation commercial PWR control system consists of soluble boron used in the primary coolant and poison control rod assemblies used for shutdown, regulating, and axial power shaping. This control system has the advantage of good axial and radial power distributions due to the uniform poisoning effect of soluble boron, but has the disadvantage of poor neutron economy due also to the presence of a relatively large amount of soluble boron. Accordingly, this type of control system is not conductive to a light water breeder reactor concept because of poor neutron economy present when one uses large quantities of boron.

The Shippingport light water breeder reactor control system consists of a movable fuel control. In this system, each active module of the core contains a central movable fuel assembly surrounded by a stationary blanket assembly. Reactivity control is accomplished by varying the axial position of the movable seed assemblies relative to the surrounding stationary blanket assembly. For a typical module, the movable speed volume is approximately 30% of the total active module volume. The Shippingport LWBR control system has the advantage of good neutron economy because it adjusts reactivity by using variable seed positions rather than a poison material. However, due to the movable fuel, the Shippingport LWBR system results in a higher axial power peaking not present in the commercial PWR. The reactivity control system of the present invention is able to achieve the neutron economy of the movable fuel Shippingport LWBR while maintaining the axial power peaking properties of commercial PWRs. Accordingly, the reactivity control system of the present invention is able to incorporate the advantages of the PWR control system and the LWBR control system of Shippingport without their attendant disadvantages.

SUMMARY OF THE INVENTION

It is the primary object of the present invention to provide a reactivity control system for a LWBR which meets all the control system requirements set forth by present PWRs.

It is another object of the present invention to provide a reactivity control system for a LWBR which maximizes absorption in fertile material and minimizes the absorption in poison material.

It is a further object of the present invention to provide a reactivity control system for a LWBR which minimizes axial and radial power peaking.

It is still another object of the present invention to provide a reactivity control system for a LWBR which maximizes the use of current light water reactor technology.

Additional objectives, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objectives and in accordance with the purpose of the present invention, as embodied and broadly described herein, the reactivity control system of the present invention comprises a reactor core having a stationary seed-blanket arrangement comprising a plurality of symmetrical, contiguous, substantially hexagonal-shaped regions. Each of these regions has a central and peripheral blanket area juxtapositioned an annular seed area and bounding the seed area. The central and peripheral blanket areas contain a plurality of blanket fuel rods wherein the blanket fuel rods contain thoria fuel pellets. The annular seed area contains a plurality of seed fuel rods and a plurality of movable thoria shim control rods. The seed fuel rods contain a mixture of thoria and urania fuel pellets. The term stationary seed-blanket arrangement is used to signify that all seed and blanket fuel rods are fixed in the core as are the fuel rods in a typical, commercial PWR core. These rods do not move as do the seed rods in the Shippingport LWBR.

In the preferred embodiment of the reactivity control system of the present invention, the cross section of said reactor core contains about 37 contiguous, symmetrical, substantially hexagonal-shaped regions.

In a further preferred embodiment of the reactivity control system of the present invention, the movable thoria shim control rods are located substantially in the center of the annular seed area of the nuclear reactor core.

In a still further preferred embodiment of the present invention, the reactivity control system also includes poison shutdown rods, poison regulating rods, axial power shaping rods, and a soluble coolant containing boron. It is, of course, understood that each of these components in the reactivity control system performs in its known conventional manner.

The reactivity control system of the present invention combines the advantages of the PWR control system and the Shippingport LWBR control system previously described. The reactor control system of the present invention, like the commercial PWR control system, has the advantage of good axial and radial distributions, but does not have the disadvantage of poor neutron economy. The reactivity control system of the present invention has the advantage of good neutron economy similar to the Shippingport LWBR system but because of the stationary seed-blanket core concept of the present invention can nearly flatten the variation in the lifetime activity and, in itself, almost eliminates the need for soluble boron at the full power operation. Accordingly, it can be seen that the reactivity control system of the present invention incorporates the best features of the pressurized water system and the Shippingport light water breeder reactor system without their attendant disadvantages. The reactor system of the present invention has good neutron economy while maintaining axial power peaking similar to a commercial pressurized water system.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

The reactivity control system of the present invention has particular utility in the operation of a light water pre-breeder/breeder reactor. The control system comprises a reactor core having a stationary seed blanket arrangement comprising a plurality of symmetrically contiguous, hexagonal-shaped regions, each of the regions containing the central and peripheral blanket area bounding an annular seed area. The central and peripheral blanket areas contain a plurality of blanket fuel rods containing thoria fuel pellets. The annular seed area contains a plurality of seed fuel rods and a plurality of movable thoria shim control rods. The seed fuel rods contain a mixture of thoria and urania fuel pellets.

Figure 1:
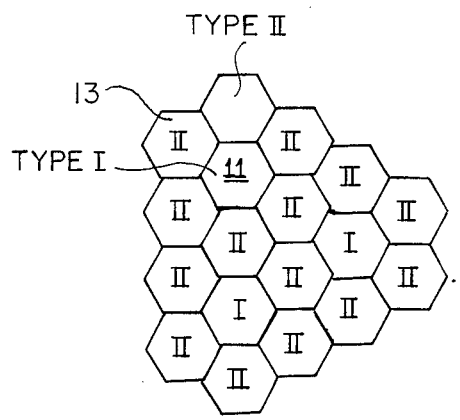
FIG. 1 is a schematic cross-sectional view of a portion of the fuel module pattern of the nuclear reactor core of the reactivity control system of the present invention.

With reference to FIG. 1, the fuel module pattern for the nuclear reactor core of the reactivity control system of the present invention is set forth. Type I fuel modules 11 and type II fuel modules 13 are described in more detail in FIG. 3.

Figure 2:
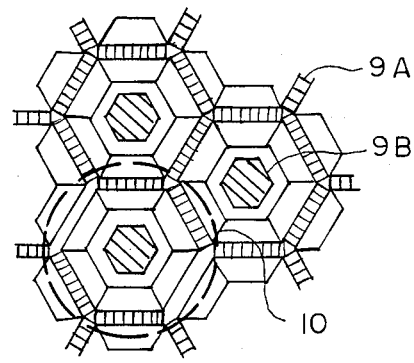
FIG. 2 is a schematic cross-sectional view of the blanket pattern superimposed on the fuel module pattern of the nuclear core of the reactivity control system of the present invention.

FIG. 2 is a cross-sectional schematic diagram of the fuel module pattern set forth in FIG. 1 wherein the outer blanket 9A and the inner blanket 9B are superimposed upon the fuel module pattern. The dash lines indicate an individual "physics cell" 10 which is set forth in detail in FIG. 3 and comprises a type I fuel modules 11 and six half sections of the type II fuel module 13. Accordingly, the physics cell 10 of the reactivity control system of the present invention comprises a total of four fuel modules.

Figure 3:
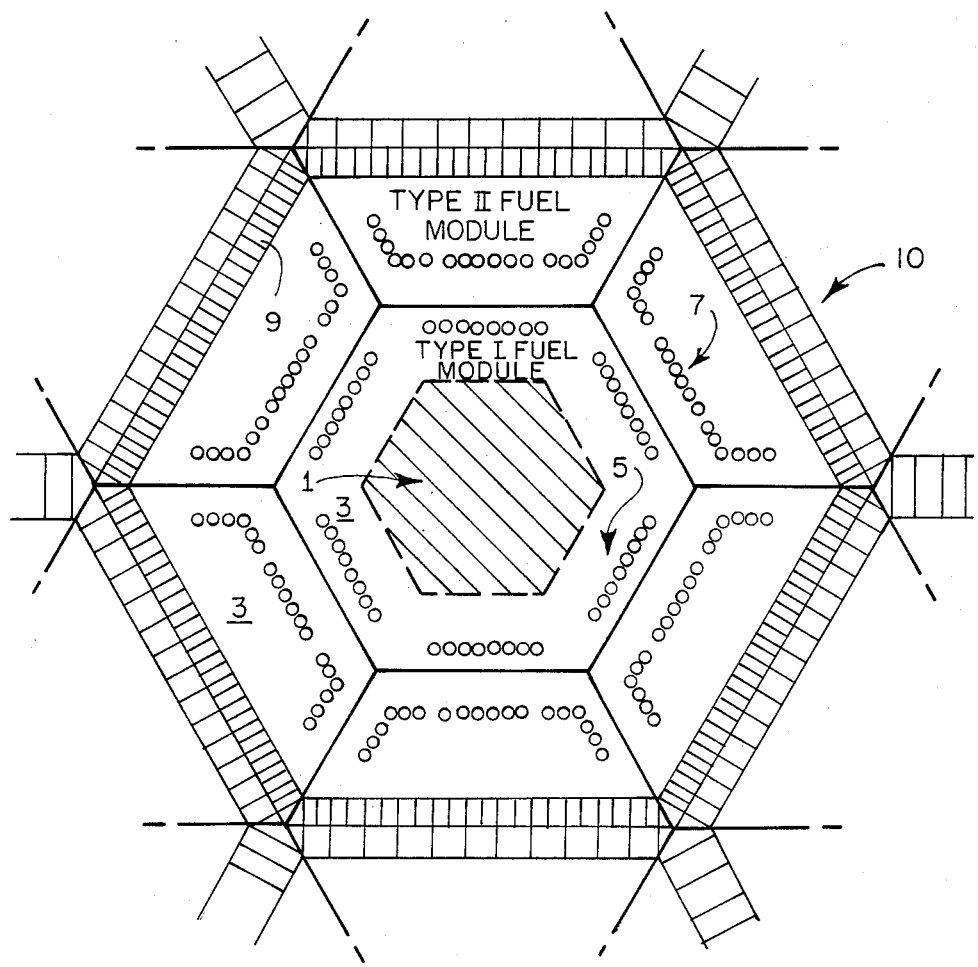
FIG. 3 is a schematic cross-sectional view of a physics cell illustrating the preferred arrangement of the blanket and seed regions comprising the nuclear reactor core of the reactivity control system of the present invention.

With reference to FIG. 3, the novel configuration for the neutron reactivity control system of the present invention will now be set forth. Inner blanket regions 1 and outer blanket region 9 surround an annular seed region 3. Inner and outer blanket regions 1 and 9, respectively, contain a plurality of blanket fuel rods containing thoria fuel pellets. Blanket region 1 and 9 bound an annular seed region 3 which contains seed fuel rods having a mixture of thoria and urania fuel pellets. Seed region 3 further contains movable thoria shim rods 7 located in the central region of the seed area 3. Also depicted in FIG. 3 are poison rods 5 which are used primarily to shut down the reactor. The only movable rods in the reactivity control system are the movable thoria shims rods and the poison rods. The blanket and seed fuel rods are fixed in place as in a typical, commercial PWR.

Typically, physics cell 10 depicted in FIG. 3 represents one of 37 separate regions over the cross section of the nuclear reactor core. Physics cell 10 depicts the location of the discrete seed and blanket rod regions 3, 1 and 9, respectively, in each of these 37 repeating regions. It is important to realize that the seed and blanket regions are stationary. This stationary seed concept provides for almost the complete elimination of the need for soluble boron during full power operation due to its effect on flattening core lifetime reactivity variation. The percentage of active core volume which is occupied by blanket regions 1 and 9 is about 30%.

Figure 4:
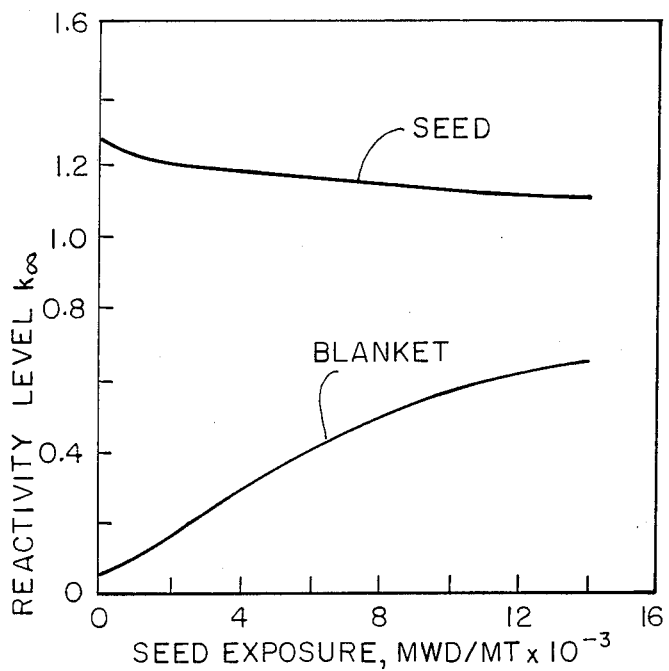
FIG. 4 is a graphical depiction of the seed and reactivity levels as a function of core life for the reactivity control system of the present invention.
Figure 5A:
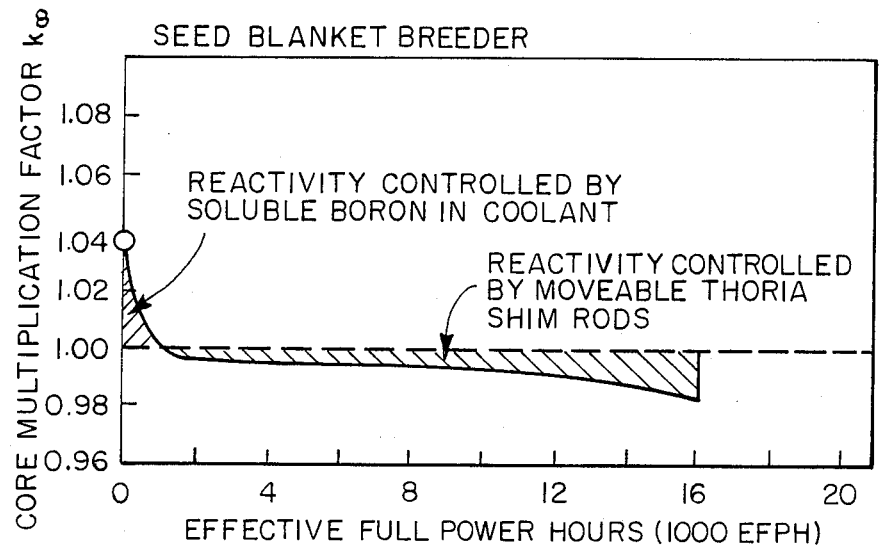
FIGS. 5A and 5B depict graphically the cell reactivity of the reactivity control system of the present invention and of a typical commercial PWR, respectively.
Figure 5B:
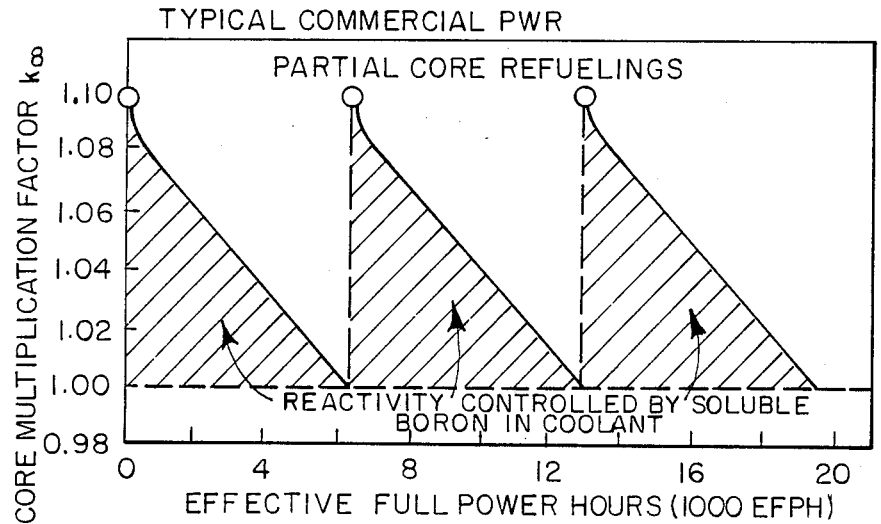

The flat reactivity variation results from the thoria blanket building up in reactivity as the thoria-urania seed is decreasing in reactivity. The seed and blanket reactivity levels as a function of core life are shown in FIG. 4 for a typical seed-blanket concept. The seed reactivity decreases from a value of 1.26 at beginning of cycle (BOC) to 1.10 at end of cycle (EOC). The corresponding blanket reactivity increases from 0.05 at BOC (the result of fast fissions in thorium) to 0.65 at EOC. The overall cell reactivity resulting from these seed and blanket variations is shown in FIG. 5A and is compared to a typical commercial PWR reactivity variation shown in FIG. 5B. The overall cell reactivity variation over the entire cycle is only 0.057 $\Delta k$. Of the 0.057 $\Delta k$ variation, 0.037 $\Delta k$ occurs in the first 1000 effective full power hours (efph). The large early reactivity drop is a result of the buildup of steady xenon (0.02 $\Delta k$ in 50 hours), samarium, and the majority of protactinium. The remaining 0.02 $\Delta k$ change in reactivity occurs from 1000 efph to 16,000 efph. Only 35% of the total change in reactivity occurs over 94% of the cycle length. Because of this reactivity behavior, soluble boron would be used to control the reactivity drop between BOC and 1000 efph, while neutron economic thoria shim rods would be used to control the reactivity changes for the remainder of the cycle.

The components of the neutron reactivity control system used in conjunction with the seed blanket arrangement shown in FIG. 3 are movable thoria shim rods 7, poison shutdown rods 5 and conventional poison regulating rods identical to shutdown rods, axial power shaping rods, and soluble boron dissolved in the coolant. The conventional poison regulating rods, axial power shaping rods and soluble boron are not specifically shown in FIG. 3. The function of each of these components is listed in Table I below. With the exception of the thoria rods, each component's function is identical with the component served in a typical commercial PWR. The thoria shim rods share some of the functions which the soluble boron and poison regulating rods have in commercial pressurized water reactors.

TABLE I

| Type | Purpose |
|---|---|
| Thoria Shim Rods | Lifetime Reactivity |
| | Transient Xenon from Load Following |
| | Partial Reactivity Uncertainty |
| | Partial Regulating |
| Poison Control Rods | Safety Shutdown |
| | Bite Control |
| | Partial Regulation (Follow Power Changes) |
| Soluble Boron | Moderator Reactivity Defect: Cold to Hot |
| | Equilibrium Xe, Sm, Pa-233 |
| | Pa-233 Decay During Shutdown |

TABLE I-continued

| Type | Purpose |
|---|---|
| Axial Shaping Rods | Partial Reactivity Uncertainty Flatten Axial Power Shape |

A detailed description and analysis of the function of the components of the control system of the present invention is now set forth.

Thoria Shim Rods

The core contains 114 thoria shim rod assemblies, with each assembly containing 36 zircaloy cladding tubes (0.345 in. outside diameter) enclosing thoria fuel pellets (not shown). The thoria shim rod assemblies can be moved vertically over the full core height by a conventional control rod drive mechanism and leadscrew (not shown in figure). Each thoria shim rod is enclosed and guided in the core region by a zircaloy guide tube (not shown), which is typical of commercial PWR practice for poison control rods. Individual shim rod assemblies or small groups of shim rod assemblies are moved as required to trim core reactivity. Shim rod assemblies are positioned either fully inserted in the core or fully withdrawn so that changing their configuration has little effect on core axial power shape.

The primary purpose of thoria shim rods is to compensate for the amount of core lifetime reactivity variation that is not compensated by seed-blanket reactivity effects. Therefore, early in life most thoria shim rods are inserted in the core and assemblies are periodically withdrawn until most are out of the core at end of cycle. However, shim rod motion can also be used to augment other components of the reactivity control system in controlling reactivity changes during power maneuvers, in controlling core radial power distribution and in compensating for core reactivity uncertainty (i.e., core bias). Thoria shim rod assemblies do not have a scram function and are not used for safety shutdown.

An analysis to determine the worth of the thoria shim rods was performed using a two-dimensional diffusion theory cluster model. The worth of the thoria shim rods was determined with shutdown rods both inserted and withdrawn at both the beginning and end of the initial breeder cycle. The results of the diffusion theory analysis are presented in Table II. With the shutdown rods withdrawn, the thoria shim rods are worth 0.042 $\Delta k$ at beginning of cycle (BOC) and 0.025 $\Delta k$ at end of cycle (EOC) for the present concept. The reason for the loss in thoria shim rod worth with exposure is due to the power building up in the blanket and the reactivity worth of the U-223 that is bred in the thoria shim rods.

TABLE II

Thoria Shim Rod Reactivity Worth Comparison

| Time in Cycle | Shutdown Rods | Shim Rod Worth, $\Delta k$ |
|---|---|---|
| BOC[1] | In | 0.44 |
| | Out | 0.42 |
| EOC[2] | In | 0.27 |
| | Out | 0.25 |

Notes
(1) BOC - Beginning of Cycle
(2) EOC - End of Cycle

It the lifetime reactivity variation between 1000 MWD/MT and the end of cycle for the initial and equilibrium breeder cycles is examined, the worth of the thoria shim rods is more than adequate to compensate for lifetime reactivity variation after 1000 MWD/MT core burnup. The initial breeder cycle loses 0.020 Δk between the 1000 MWD/MT point and the end-of-cycle while the equilibrium cycles lose 0.017 Δk for the same portion of the cycle.

The effect of the thoria shim rods actually moving throughout the cycle to maintain criticality could, however, effect the reactivity variation somewhat because the core water content increases slightly as the rods are withdrawn. To determine the magnitude and direction of this effect, the thoria shim rod position was adjusted in an R-Z diffusion theory model during core life to control the variation in reactivity. The result of this analysis showed that 25% of the thoria shim rods were still fully inserted at end of cycle with the model still critical. This would result in an excess margin of 0.006 Δk and shows that the effect of the thoria rods moving through the cycle is small, as would be expected, because of the small amount of thoria volume and the flatness of the reactivity profile.

Poison Control Rods

Each of the 37 physics cells in the core has a centrally located assembly of 48 poison pins. Just like commercial PWR's, the individual pins of Cd-In-Ag neutron absorber (0.341-in. pellet diameter) are clad in stainless steel. The assemblies are moved vertically by a conventional control rod drive mechanism, and the individual pins are enclosed and guided in the core region by zircaloy guide tubes.

About two-thirds of the 37 assemblies in the core are designated as shutdown rods. They are fully withdrawn from the core before reactor criticality, and their function is to rapidly drop into the core under the force of gravity upon a reactor shutdown command (i.e., a reactor scram). The remainder of the 37 poison rod assemblies that are not designated as shutdown rods are designated as regulating rods. They are mechanically identical to the shutdown rod assemblies. The poison regulating rod assemblies are moved in small sub-groups as necessary to control reactor power level. Near full power the amount of the soluble boron in the coolant and the thoria shim rod positions are adjusted so that the poison regulating rod groups are nearly fully withdrawn from the active core. Consequently, they have a minimal effect on core power shape and breeding ratio at full power steady-state conditions. This method of operation is the same as the use of poison regulating rods in commercial PWR's. in addition to the role of shutdown and power regulating, a small number of the 37 poison control rod clusters would also act as "bite" rods, which would supply fine operational control.

The worth of all poison control rods was calculated with shim rods inserted and withdrawn at both the beginning and end of the initial cycle breeder. The results of the diffusion theory analysis are presented in Table III. With the thoria shim rods inserted, the poison control rods are worth 0.107 Δk at BOC and 0.081 Δk at EOC. The loss in worth with life is the result of power building up in the blanket. It should be noted that these rod worths as determined with two-dimensional diffusion theory cluster models would decrease somewhat on a full core basis because of radial leakage.

TABLE III

| Shutdown Rod Worth Comparison | | |
|---|---|---|
| Time in Cycle | Shim Rods | Shutdown Rod Worth, Δ k |
| BOC[1] | In | .107 |

TABLE III-continued

| Shutdown Rod Worth Comparison | | |
|---|---|---|
| Time in Cycle | Shim Rods | Shutdown Rod Worth, Δ k |
| | Out | .096 |
| BOC[2] | In | .081 |
| | Out | .080 |

Notes
[1]BOC - Beginning Cycle
[2]EOC - End of Cycle.

An Analysis to determine the worth of leakage and the effect of having the most reactive control rod cluster removed from the core has been performed with a two-dimensional diffusion theory model and a full core three-dimensional RCP01 Monte Carlo model. The analysis consisted of beginning and end of cycle calculations for the diffusion theory model and beginning of cycle calculations for the Monte Carlo model. The results of this analysis shown that the reactivity worth of all 37 shutdown rods with one cluster removed from the core is 0.081 Δk at the beginning of cycle and 0.067 Δk at the end of cycle.

To determine if this shutdown reactivity worth is adequate, the amount of negative reactivity needed between hot full power and hot zero power was examined (soluble boron would be used for cold shutdown). The reactivity increase from hot full power to hot zero power is due to fuel and moderator temperature variation, moderator voids, poison rod bite and boron deadband, and part length axial shaping rod effects. For the seed-blanket breeder concept, the fuel temperature of Doppler coefficient has been calculated by the RCP Monte Carlo code using the perturbation theory option. The results of this analysis are shown in table IV. The total reactivity variation from hot zero power to hot full power, due to the fuel temperature change (560° to 1200° F.), is 0.015 Δk with a Doppler coefficient of $-2.1 \times 10^{-4}$ Δρ/F. or 0.007 Δk for the total moderator temperature variation between the hot full power and hot zero power condition, which assumes a 30° F. change (590° to 560° F.). The reactivity effects due to moderator voids, poison rod bite and boron deadband, and part length rods have not been explicitly determined for the breeder but would be similar to commercial PWRs. An estimate of these values result in a total of 0.006 Δk; 0.001 Δk for moderator voids, 0.002 Δk for control element assembly (CEA) bit and boron deadband and 0.003 Δk for part length CEA effects. An additional allowance of 0.012 Δk is included to provide for flux redistribution and control worth uncertainty. The total reactivity for all effects would then be 0.040 Δk for the breeder concept and would correspond to the rod worth required for shutdown margin and accident allowance. If the minimum stuck rod shutdown worth of 0.067 (end of cycle value with one rod cluster removed) is compared to the requirement of 0.040 Δk, the resulting difference of 0.027 Δk would be sufficient for shutdown margin and accident analysis allowance. A comparison of the available poison control rod worth and control requirements is presented in Table V for the breeder concept of the present invention and several commercial PWR designs.

TABLE IV

Doppler Reactivity Temperature Defect

| | Δk | | Δk | | |
|---|---|---|---|---|---|
| | Cold Zero Power | Hot Zero Power | Hot Zero Power | Hot Zero Power | Total Doppler Defect |
| Prebreeder Fuel Rod (4 w/o U-235) | −.0122 | | −.0116 | | −.0238 |
| Seed-Blanket Breeder Module | −.0144 | | −.0151 | | −.0295 |

TABLE V

Available and Required Control Worth Comparison
(End of Equilibrium Cycle)

| | Commercial PWRs | | | Light Water Seed-Blanket Breeder |
|---|---|---|---|---|
| | CE-80[1] | B + W[2] | Westinghouse[3] | |
| Control Requirements, % Δρ | 4.0 | 3.4 | 3.9 | 4.0 |
| Poison shutdown rod worth with all but highest worth rod cluster inserted, % Δρ | 9.4 | 6.8 | 6.2 | 6.7 |
| Net rod worth available for accident analysis allowance and shutdown % Δρ | 5.4 | 3.4 | 2.3 | 2.7 |

[1]Docket-STN-50470, "PWR Nuclear Steam Supply System 80 PSAR," dated December 18, 1973.
[2]Docket-STN-50561-1, "Babcock and Wilcox Safety Analysis Report," dated February 27, 1976.
[3]Docket-RESARA-23, "Westinghouse Nuclear Energy Systems RSAR," Vol. II (Consolidated Version) dated November 1973.

Poison Regulating Rods

The function of the poison regulating rods in the breeder conceptual design, as in a commercial PWR, is to follow power maneuvers. The regulating rod operation for the breeder concept would be similar to a commercial PWR. The groups of regulating rod clusters would be operated in a programmed manner to minimize their effect on axial power peaking. Each regulating rod group would consist of 3 of the 37 control rod drive mechanisms (CRDM's).

To determine how such a regulating rod group would effect reactivity and power distributions, an analysis was performed using an R-Z diffusion theory cluster model. To simulate groups of regulating rods in a full core with a single cluster model, the shutdown rod area was divided into 2 regions. One region represented the regulating rod group and was approximately 35% of the total shutdown area. The second region represented the remainder of the shutdown rods. The first region was subdivided into four subregions of equal volume and simulated approximately four groups of regulating rods. The results of the diffusion theory analysis are presented in Table VI and show the percent insertion of each of the four regulating banks together with the effect of the insertion on axial power peak and excess reactivity level. The programmed pattern shown assumes that each group begins its insertion when the previous group is 60% inserted and then both groups move in at the same rate of insertion. The percent axial power offset is a measure of the difference in total power between either axial half of the core. In a commercial PWR this value is used to determine when to move the part length axial shaping rods. The data in Table IV shows that the four groups result in a total reactivity worth of approximately 0.04 Δk and a maximum axial peak-to-average power of 1.81, which occurs when the first group is 60% inserted.

TABLE VI

Effect of Poison Regulation Rod Insertion
On Axial Power Distribution and Reactivity Level
Breeder Cluster Model HX7B, Beginning of Initial Cycle

| | % Each Regulating Bank is Inserted | | | | Axial Peak/Ave. Power | Axial Power Offset[1] | $k_{oo}$ | Location of Axial Power Peak[2] |
|---|---|---|---|---|---|---|---|---|
| Case | 1 | 2 | 3 | 4 | | | | |
| 1 | 0 | 0 | 0 | 0 | 1.518 | 0 | 1.0476 | 72 |
| 2 | 40 | 0 | 0 | 0 | 1.743 | −25.0 | 1.0449 | 56 |
| 3 | 60 | 0 | 0 | 0 | 1.809 | −32.6 | 1.0410 | 46 |
| 4 | 80 | 20 | 0 | 0 | 1.544 | −23.6 | 1.0360 | 54 |
| 5 | 100 | 40 | 0 | 0 | 1.724 | −23.4 | 1.0329 | 58 |
| 6 | 100 | 60 | 0 | 0 | 1.764 | −29.7 | 1.0294 | 46 |
| 7 | 100 | 80 | 20 | 0 | 1.534 | −21.3 | 1.0250 | 54 |
| 8 | 100 | 100 | 40 | 0 | 1.704 | −21.5 | 1.0222 | 58 |
| 9 | 100 | 100 | 60 | 0 | 1.723 | −26.9 | 1.0189 | 48 |
| 10 | 100 | 100 | 80 | 20 | 1.547 | −20.7 | 1.0151 | 54 |
| 11 | 100 | 100 | 100 | 40 | 1.667 | −20.4 | 1.0125 | 58 |
| 12 | 100 | 100 | 100 | 60 | 1.648 | −24.8 | 1.0095 | 48 |
| 13 | 100 | 100 | 100 | 80 | 1.478 | −10.3 | 1.0063 | 62 |
| 14 | 100 | 100 | 100 | 100 | 1.518 | −0.9 | 1.0057 | 72 |

[1]Axial Power Offset = $\frac{\Sigma \text{ Power in Top Half of Core} - \Sigma \text{ Power in Bottom Half of Core}}{\text{Total Power in Core}} \times \frac{100}{1}$

[2]Inches above Bottom of Active Fuel (Active Fuel Height is 144 inches)

The results just presented do not include the effect of Doppler feedback. To determine the reduction in axial power due to this effect, a series of calculations was performed on the same R-Z diffusion theory model but with Doppler iterations included. The calculations performed included the insertion of the first regulating rod bank from 0% insertion to 60% insertion. The results of this calculation show that with Doppler feedback the maximum axial peak-to-average power decreases from 1.81 to 1.65.

Poison Bite Control

The function of the control rod bite is to supply fine shim control that would work in conjunction with soluble boron and thoria shim rods. The worth of the bite rods in the seed-blanket prebreeder/breeder conceptual reactor system is estimated to be between 0.001 and 0.002 Δk. The poison rod clusters allocated to a bite function would be inserted slightly at the top of the core during power operation. It is clear that the number, worth and insertion limits of these rods would have to be determined prior to inclusion in the control system of the present invention. To minimize the effect of the poison bite rods on breeding, the use of thoria followers would be beneficial. Such followers might be reprocessed to recover the U-233 which would be converted from the thoria in each follower.

Axial Power Shaping Rods

Commercial PWR's include some poison rod assemblies which have the active poison length extending over only a fraction of the full core length. These part length poison rod assemblies are positioned as necessary to control the reactor axial power peaking. If axial power shaping rods should be needed for the prebreeder/breeder system, movable assemblies of part length poison pins would replace a small fraction of the thoria shim rod assemblies. These axial power shaping rod assemblies would be used exactly as they are in commercial PWR's.

The need for axial shaping rods for axial stability had not been completely determined. An initial stability shows that the breeder would be more stable than the prebreeder or a commercial PWR, and may therefor not require shaping rods. the prebreeder concept could, however, require the shaping rods as in a commercial PWR.

Preliminary studies indicate that if axial shaping rods were needed, only a small fraction (3 to 5%) of the thoria shim rod locations would be required for shaping rods. The use of shaping rods could easily reduce the axial peak to average power to below 1.5 for all power maneuvers.

Boron Control Systems

Just as in a commercial PWR, soluble boron (in the form of boric acid) would be injected into the primary coolant as needed. This would include cold shutdown and hot standby conditions. At beginning of cycle or after a long shutdown, soluble boron would be needed at full power conditions until transient poisons such as xenon, samarium and protactinium build to equilibrium concentrations. At other times in life, soluble boron is not required at full power equilibrium conditions because the thoria shim rods have sufficient reactivity worth to trim core reactivity. For these conditions, which are the majority of life for a base-load reactor concept, the boron concentration in the coolant would be reduced to a low level to enhance the core neutron economy. This boron level is expected to be as low as 3 ppm and would have a very small effect on breeding performance (reduce FIR, the ratio of fissile fuel at the EOC to the fissile fuel at BOC, by less than 0.01%). Soluble boron would also be needed to help control xenon transients and to control the reactivity resulting from the decay of protactinium after core shutdown. Soluble boron may or may not have to be injected for reduced power operation, such as a downpower maneuver, at any given time in life depending on the magnitude and duration of the maneuver, the availability of reactivity worth in thoria shim rods, and limitations on poison regulating rod limits.

The amount of soluble boron needed for the seed-blanket breeder has been determined by an RCP10 Monte Carlo analysis in which varying amounts of soluble boron were added to the cold and hot cluster models. The results of this analysis show that about 2300 ppm of boron (weight ppm of natural boron) would be needed to keep the reactor just critical at beginning of cycle with all control rods removed and the reactor in a cold (68° F.) zero-power condition. With all thoria shim rods and poison shutdown rods inserted, this value would reduce to approximately 250 ppm. The hot, full power, no xenon core condition would be just critical with approximately 840 ppm of boron at BOC with the thoria shim rods inserted and the poison shutdown rods withdrawn. This hot operation value would reduce to approximately 360 ppm when xenon is built up to a steady-state value (less than 50 hours) and to less than 10 ppm by 1000 MWD/MT as protactinium reached equilibrium. The soluble boron requirements for these and other selected breeder core conditions are summarized in Table VII.

TABLE VII

| BREEDER SOLUBLE BORON REQUIREMENTS FOR SELECTED CORE CONDITIONS | | | | | | | |
|---|---|---|---|---|---|---|---|
| Core Avg. Temp., °F. | Power Level | Xenon Cond. | Time in Cycle | Control Rod Condition | | Approx. Excess React. $\Delta\rho$ | Approx. Boron Conc. for Critical Reactor, ppm* |
| | | | | Thoria Shim | Poison Shutdown | | |
| 68 | Zero | No | BOC | OUT | OUT | 0.138 | 2300 |
| 68 | Zero | No | BOC | IN | IN | 0.020 | 250 |
| 560 | Zero | No | BOC | IN | OUT | 0.056 | 1380 |
| 590 | Full | No | BOC | IN | OUT | 0.035 | 840 |
| 590 | Full | Steady-State | 50 MWD/MT | IN | OUT | 0.016 | 360 |
| 590 | Full | Steady-State | 1000 MWD/MT | IN | OUT | 0.0 | 10 |

*PPM Boron corresponds to weight ppm of natural boron in coolant wtih the coolant density corresponding to the temperature shown.

The boron concentration in the primary system would be reduced by diluting the primary system coolant with boron-free coolant by a feed-and-bleed procedure, as in a commercial PWR. The discharged coolant is directed to hold tanks and then to a boron cleanup system for removal of the boron, which can be reused. High concentrations of boron can be removed by an evaporation system; low concentrations of boron can be removed with ion-exchanger resins. A typical 3800-MW Westinghouse PWR system has the following characteristics:

Reactor primary system volume, gal.: 71000
Let-down flow rate, gpm: 250
Recycle hold tank volume, gal: 160000
Boron recovery system
evaporation capacity, gpm: 30
Anion resin bed volume: $2 \times 460$ ft$^3$ A typical PWR system such as this could be applied to the seed-blanket breeder reactor plant. However, it would have to serve more demanding duty than in a typical PWR. Because commercial PWR's operate for most of core life with a boron concentration of several hundred ppm in the primary coolant, only a fraction of the coolant inventory needs to be exchanged by a feed-and-bleed process to accomplish a significant reduction in boron concentration. In the breeder, recovering from a typical large power maneuver (100 to 30 to 100%) would require reducing boron concentration in the primary system from about 100 ppm to about 3 ppm. With a feed-and bleed process this would require boron cleanup and approximately 350,000 gallons of discharged primary coolant.

For application of the PWR System described above to the breeder, the initial 160,000 gallons of discharged primary coolant would be routed to the boron recycle hold tanks for eventual cleanup by evaporation. This would reduce primary system boron concentration to about 10 ppm. Thereafter, the full flow of discharged primary coolant would be directed to one of the two anion resin ion exchangers for boron removal. Boron dilution of the breeder primary system could be accomplished within 24 hours, which is well within the time needed to reach steady-state xenon conditions. Reprocessing of the water in the recycle hold tanks would require 3.5 days using the 30-gpm evaporation capacity. Approximately 30 complete power cycles could be handled by a single 460 ft$^3$ resin bed, assuming that boron breakthrough (the point at which the resin bed can no longer remove nearly all the incoming boron) occurs at about 40% saturation. The typical PWR system could handle a design power swing about twice a week. To permit a design power swing once a day would require larger evaporator capacity (about 100 gpm) and periodic replacement of the anion resin beds during a core cycle.

Because a typical PWR boron recovery system would be burdened in a breeder plant application, several potential alternate boron cleanup systems have been identified. One system would accomplish nearly all boron removal with anion resin beds, but would regenerate the resin when its boron concentration reaches the breakthrough saturation values. The resin would be transferred hydraulically to a regeneration vessel where it would be treated with KOH (or LiOH), rinsed and then recharged to the resin bed. The regenerant and rinse water would be evaporated for reuse. A similar recover process is in use in the Pressurized Steam Generating Heavy Water Reactor in England.

A second alternate system is electrodialysis deionization (EDDI) process which combines ion exchange and ion transport to remove and selectively recover ionic chemicals. Electrodialysis is a voltage driven process which transports ions while exchange resins provide ionic removal and water purification. The EDDI technique provides a novel design combination of ion exchange resin loaded into electrodialysis cell compartments to purify the feed stream, concentrate and recover chemicals, and provide continuous exchange resin regeneration. The EDDI system would be used similar to the ion exchange with resin recovery system except that resin recover is a continuous process instead of a bath process. In addition, almost 99% recovery of lithium hydroxide from the primary coolant is possible. Babcock and Wilcox has a patent on the EDDI system, U.S. Pat. No. 4,148,708.

Electrical Load Following

The reactivity control system of the light water seed-blanket pre-breeder/breeder concept has been designed so that breeding will be maximized when the reactors are operated near full power as base-load plants. The control system allows the prebreeder and breeder to load-follow using poison control rods that are fully withdrawn from the active core at full power operation, as is done with current commercial PWR's. There will be a small loss in breeding performance during load following because poison rods and soluble boron will decrease the neutron economy of the core. This control system is considered adequate for the first generation of light water prebreeder and breeder power plants for the following reasons:

1. The prebreeder and breeder plants are expected to be base-loaded for the majority of their plant life because of their good fuel utilization.

2. Breeding is maximized when the breeder and prebreeder plants are operated as base-load units.

3. Even if the prebreeder and breeder plants are operated as load-following units and control power maneuvers with poison rods, their fuel utilization will still be much better than low enriched uranium PWRs.

4. The loss of breeding due to load following with poison rods is expected to be relatively small.

The foregoing description of a preferred embodiment of the invention has been presented for purposes of illustrations and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claim appended hereto.

We claim:

1. The combination of a neutron reactivity control system and a light water pre-breeder/breeder reactor comprising:

a reactor core having a stationary seed-blanket arrangement of a plurality of symmetrical, contiguous hexagonal shaped physics cell regions, each of said cell regions comprising:

a hexagonal shaped inner fuel module including a hexagonal shaped inner blanket region of stationary blanket fuel rods containing thoria fuel pellets, said inner blanket region centrally positioned in said inner fuel module, and a hexagonal shaped, annular first seed region which surrounds said inner blanket region and which includes stationary seed fuel rods having a mixture of thoria and urania fuel pellets and the combination of a neutron reactivity control system and a light water pre-breeder/breeder reactor comprising: movable poison rods of neutron absorption materials which are used to shut down and control the reactor core and which are symmetrically arranged about said inner blanket region; and a hexagonal shaped, annular outer fuel module which is contigious to and arranged symmetrically about said first seed region of said inner fuel module, said outer fuel module including an outer annular periphal blanket region of stationary blanket fuel rods containing thoria fuel pellets which defines the outer periphery of said physics cell and an annular second seed region which is contiguous with and which surrounds said inner fuel module, said second seed region including stationary seed fuel rods having a mixture of thoria and urania fuel pellets, and a plurality of movable shim control rods containing thoria materials for controlling the reactivity of the reactor core.

* * * * *